United States Patent
Tobiasz (10) Patent No.: US 6,298,968 B1
(45) Date of Patent: Oct. 9, 2001

(54) HYDRAULIC TRANSMITTER WITH INCORPORATED RESERVOIR AND HYDRAULIC CONTROL COMPRISING SUCH A TRANSMITTER

(75) Inventor: André Tobiasz, Epinay-sur-Seine (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/423,527
(22) PCT Filed: Apr. 9, 1999
(86) PCT No.: PCT/FR99/00840
  § 371 Date: Feb. 18, 2000
  § 102(e) Date: Feb. 18, 2000
(87) PCT Pub. No.: WO99/53210
  PCT Pub. Date: Oct. 21, 1999

(30) Foreign Application Priority Data

Apr. 10, 1998 (FR) .................................. 98 04573
Apr. 10, 1998 (FR) .................................. 98 04574

(51) Int. Cl.⁷ .................................................. F16D 25/08
(52) U.S. Cl. ........................................ 192/85 C; 192/91 R
(58) Field of Search ........................... 192/85 C, 91 R; 60/585, 586, 588, 589, 594

(56) References Cited

U.S. PATENT DOCUMENTS

| 1,707,063 | 3/1929 | Loughead et al. . |
| 1,915,701 | 6/1933 | Thomas et al. . |
| 2,161,277 | 6/1939 | Bowen et al. . |
| 2,282,390 | 5/1942 | Baisch et al. . |
| 3,441,319 | 4/1969 | Boueil et al. . |

FOREIGN PATENT DOCUMENTS

| 3839318 A1 | 6/1989 | (DE) . |
| 4435260 A1 | 4/1995 | (DE) . |
| 0386330 | 12/1989 | (EP) . |
| 2142363 | 1/1973 | (FR) . |
| 2522757 | 9/1983 | (FR) . |
| PCT/FR99/00840 | 4/1999 | (FR) . |
| 410243 | 12/1932 | (GB) . |
| 389930 | 3/1933 | (GB) . |
| 411537 | 6/1934 | (GB) . |
| 910889 | 6/1959 | (GB) . |
| 3111411A1 | 3/1981 | (GB) . |
| WO 95/25028 | 9/1995 | (WO) . |

Primary Examiner—Charles A Marmor
Assistant Examiner—Saúl Rodríguez
(74) Attorney, Agent, or Firm—Liniak, Berenato, Longacre & White (57) ABSTRACT

A transmitter for hydraulic control controlled by a controlling member including a hydraulic chamber having a piston mounted thereto by means of a joint. The hydraulic chamber defines a pressure chamber with variable volume connected to a hydraulic line. A reservoir is connected to the pressure chamber via a passage. A mechanism for preventing the fluid from returning to the reservoir and a mechanism for transmitting the control member movement to the piston is also provided. The hydraulic chamber is extends along its axis defining a reserve volume and is adapted to receive the piston and containing hydraulic fluid up to a level sufficient for the joint to be immersed therein. The hydraulic chamber and the reservoir volume are arranged in a single housing. The transmission mechanism includes of two parts. The first part is internal to the housing and connected to the piston and the other part is external to the housing.

45 Claims, 3 Drawing Sheets

HYDRAULIC TRANSMITTER WITH INCORPORATED RESERVOIR AND HYDRAULIC CONTROL COMPRISING SUCH A TRANSMITTER

BACKGROUND OF THE INVENTION

1. Field of the Invention

This invention relates to a hydraulic circuit, especially for a clutch. More particularly it relates to an emitter device which is adapted to transmit an order for control to a receiver device through a hydraulic path.

2. Description of the Related Art

Such apparatus is known conventionally under the name of a master cylinder. In a traditional configuration, the master cylinder comprises two main parts which are, firstly, a piston and cylinder assembly in which the piston is actuated by a pedal, for example a clutch pedal, and secondly, a hydraulic fluid reservoir which is adapted to compensate for the variations in volume in the fluid due to wear in the clutch liners or due to possible leaks in the hydraulic circuit.

Apparatuses of this kind are for example described in the document FR-A-2 522 757. In general terms they comprise, between the reservoir and the hydraulic chamber defined by the cylinder and in which the piston is displaceable, a non-return means which enables the circuit to be refilled in its rest position and enables the circuit to be put under pressure.

In these traditional apparatuses, the seals which provide sealing of the pressure chamber often consist of a seal carried by the piston or, as in the above mentioned document, a flexible membrane which is disposed between the piston and the cylinder; the central portion of this membrane, which is fixed to the cylinder by its periphery, follows the longitudinal displacements of the piston during engagement and disengagement of the clutch. These seals are subjected on one of their faces to a fluid environment, and on their other faces to an atmospheric environment which results in a dry and often polluted surface. This difference in environment, and the action of pressure, leads to a relatively limited useful life of these seals, which is the source of leaks that are potentially dangerous, in this case for the user of the vehicle.

Receiver devices, located at the end of the hydraulic circuit, for example in line with the clutch release bearing, operate and are designed in principle substantially identically to those of the emitters. They naturally have the same problems in practice in the traditional technology.

SUMMARY OF THE INVENTION

The invention aims to provide an emitter device for a hydraulic circuit which enables optimum conditions to be obtained for reliability of the seals in operation, and also to prevent premature wear and aging of the circuit, and therefore to ensure durable sealing and hence increased operational safety for this critical member, in particular when it is used to equip a traveling vehicle.

According to another object of the invention, the emitter device is simple and inexpensive to manufacture.

To this end, the invention proposes an emitter for a hydraulic control system, adapted to be controlled by a control member and comprising a hydraulic chamber, in which a piston is mounted for sliding movement sealed by a seal which it carries, and defining therein a variable volume pressure chamber connected to a hydraulic pipe, a hydraulic fluid reservoir connected to the said pressure chamber through at least one passage, a means for preventing return of fluid to the reservoir during pressurisation of the pipe, and a means for transmitting movement of the control member to the piston, characterised in that the hydraulic chamber is extended along its longitudinal axis by a reserve space which is adapted to receive the piston in its rest position when the circuit is unpressurised, the said reserve space containing hydraulic fluid up to a level which is sufficient for the seal to be immersed therein, the hydraulic chamber and the reserve space being formed in a common casing, and in that the transmission means consists of at least two parts, one of which is internal to the casing and connected to the piston, while the other one is external to the casing, the two parts being coupled together through means passing through the wall of the casing.

Thanks to this arrangement, the piston, and therefore the seal which it carries, are integrally and durably immersed in the hydraulic liquid.

Preferably, the reserve space is adapted to contain hydraulic fluid up to a normal fluid level so as to constitute the volumetric compensation reservoir of the hydraulic circuit.

Advantageously, the part internal to the casing extends through the free surface of the liquid, and the means extending through the casing extends through the latter above the level of the liquid.

These arrangements have several advantages. In the first place, they lead to a considerable simplification in the manufacture of the emitter device, by grouping elements in a single unit.

In the second place, and much more importantly, the seals which seal the pressure chamber during pressurisation of the circuit are immersed in the hydraulic fluid, on one side within the pressure chamber and on the other side within the reservoir, which ensures perfect lubrication and eliminates pollution and the action of air, and therefore both wear and aging of the seal.

It will also be understood that it is possible here to provide a satisfactory seal closing off the pressure chamber and being of a simple type, with any marginal leaks of fluids out of the pressure chamber being here "recycled" , so that the fluid is then simply returned into the fluid reservoir. It is evident that this contributes to economy in the choice of seals for the emitter device, while increasing general reliability.

It should be noted that this arrangement also prevents the reverse entry of air bubbles and polluting particles into the hydraulic circuit, since the cylinder is totally immersed in the fluid.

This arrangement therefore has a number of intrinsic advantages, both as to simplicity of manufacture and as to safety for the user.

In accordance with particular arrangements, which can if desired be combined:

- the means for transmission of the movements of the piston consists of three levers fixed to a shaft, which is free to rotate about a horizontal axis and which extends through the side walls of the casing, with one of the levers, namely an internal lever, being included in the reservoir, while the other two levers, being external levers, are outside the casing on either side of the latter. Such a symmetrical arrangement leads to a symmetry in the forces, thus preventing parasitic reactions on the pivot axis A of the levers;
- the hydraulic chamber and the reserve space are incorporated in the casing, which is substantially symmetrical on a vertical plane containing the longitudinal axis of the pressure chamber, the side walls of the casing being mainly vertical, and the three levers having substantially identical geometry;

the three levers are of identical lengths, so as to reduce even further the parasitic reactions on the axis A;

the means fastening the levers on the shaft consists of rings fitted on the shaft between the said levers;

preferably, the rings are ratchet rings of a material harder than that of the levers, and on which the levers are an interference fit;

sealing of the casing in the region of the shaft is provided by means of annular seals which are fitted on the outside of the rings, between the internal lever and the side walls of the casing;

the three levers are fixed to the shaft in the same angular position, which diminishes even more the reaction forces on the axis A;

the casing has, on the outer faces of its side walls, ribs which define abutments for limiting the maximum amplitude of the movements of the levers.

These various arrangements are adapted to permit the simple realisation of a two-part transmission means, in which the coupling between the two parts is disposed outside the hydraulic fluid, in this case above the normal level of the fluid in the reservoir.

The rotary seals ensure sealing between the internal part of the control unit and the external part which works at a low amplitude, which leads to simple manufacture, reduced cost and extended useful life.

In further particular arrangements relating to the pressure chamber and the volumetric compensation means of the hydraulic fluid circuit, the head of the piston is guided by the inner wall of the hydraulic chamber during its travel;

the piston has a head in the form of a spherical ring, for taking account of the maximum tilt angle of the piston due to the path of travel of its rear part through which it is connected to the internal lever;

the passages connecting the reservoir to the pressure chamber are grooves formed within the inner wall of the cylindrical chamber at the level of its exit into the reserve space, the said grooves having a direction which is substantially parallel to the longitudinal axis of the cylindrical chamber;

the passages connecting the reservoir to the pressure chamber are grooves formed at the outer periphery of a sleeve member which is force-fitted in a seating formed in the interior of the casing, at the inlet end of the cylindrical chamber with which they communicate through an axial clearance;

the grooves are spaced apart circumferentially at regular intervals;

at least the ends of the grooves are disposed at an angle, with respect to the longitudinal axis of the cylindrical chamber, which is the same as the corresponding angle in the rest position of the piston;

the means for preventing return of fluid to the reservoir during pressurisation of the circuit consists of the seal;

the seal is a joint of simple technology, being for example toroidal or of rectangular cross section, located in line with the ends of the grooves when the piston is in its rest position.

The invention is also directed to a hydraulic control system including an emitter of the kind set forth above, preferably associated with a hydraulic receiver the structure of which is similar to that of the emitter.

Advantageously, the hydraulic control system includes a receiver comprising a cylindrical chamber, a piston mounted for sliding movement in the cylindrical chamber so as to define therein a variable volume pressure chamber connected to the hydraulic pipe, a means for transmitting movements of the piston to the outside, and a means for sealing the pressure chamber, the said receiver being characterised in that the pressure chamber is extended along its longitudinal axis by a downstream space which is adapted to receive the piston in its pressure position when the circuit is pressurised, the cylindrical chamber and the downstream space being incorporated within a single casing, and the transmission means consists of at least two parts, one of which is internal to the casing while the other one is outside the casing, the two parts being connected together through a means extending sealingly through the wall of the casing.

Preferably, the transmission means comprises three levers fixed to a shaft which is freely rotatable about a horizontal axis extending through the side walls of the casing, with one of the levers, namely an internal lever, being situated in the casing while the other two levers, being external levers external to the casing, are symmetrical to each other and longer than the internal lever.

Advantageously, the control member is a hydraulic control unit for a clutch, in which the clutch includes resilient gripping means and declutching means consisting of declutching levers, and a clutch release bearing adapted to act on the ends of the declutching levers being provided for disengaging the clutch, and the helical spring subjects the internal lever to a force which is such that, through the external levers, the clutch release bearing is in contact with the declutching levers, the resilient gripping means of the clutch exerting a force very much greater than that exerted by the helical spring.

The description and drawings of a preferred embodiment of the invention which are given below will lead to a better understanding of the objects and advantages of the invention. It should be made clear that this description is given by way of example, and is not at all limiting. In the drawings:

DETAILED DESCRIPTION OF THE PREFERRED EMBODIMENT

Figure 1:
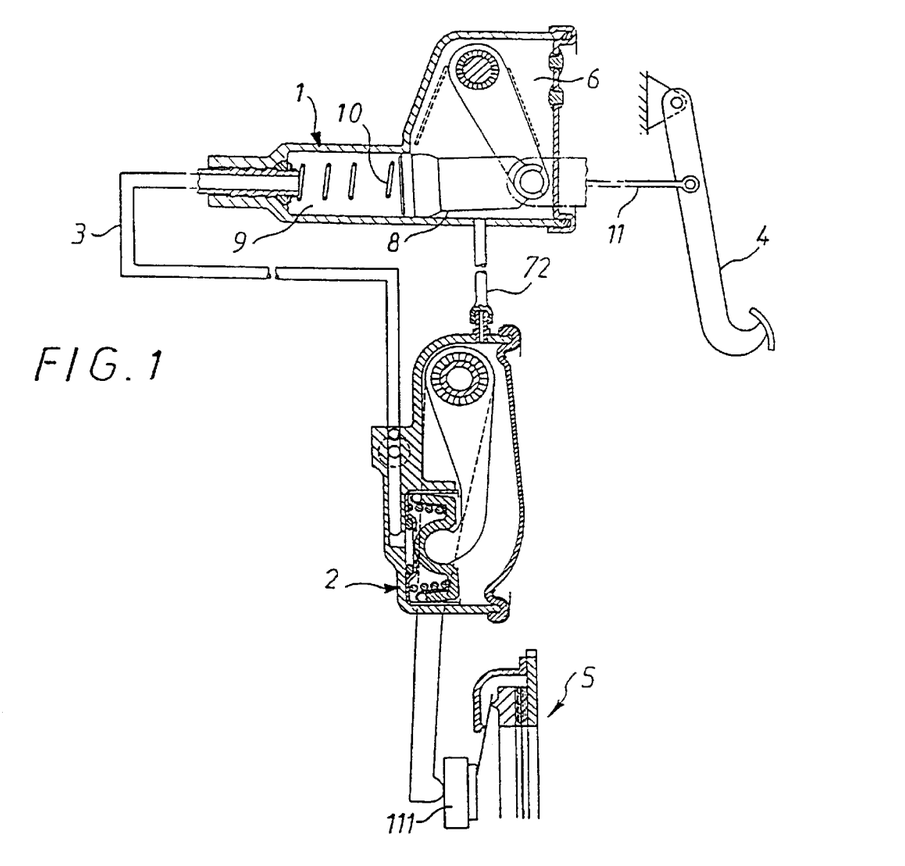
FIG. 1 is a view of the whole of a hydraulic circuit in an application to a clutch control system, in one practical form in accordance with the invention.

As can be seen in FIG. 1, a hydraulic apparatus comprises an emitter 1 and a receiver 2, between which there is installed a hydraulic fluid pipe 3 which transmits to the receiver 2 the variations in volume that are caused to take place in the emitter 1 by a control means 4. The receiver 2 is arranged to actuate, in response to the foregoing, any type of mechanical device whatsoever, which in this example is a clutch 5.

In greater detail, in a practical embodiment such as that which is shown in FIG. 1, the emitter 1 consists mainly of a piston 8 which slides in a cylindrical hydraulic chamber 9 and which, as a consequence defines in the latter a variable volume which is arranged to contain a hydraulic fluid.

The piston 8 is naturally spaced away from the base of the piston 9 by a spring 10, which defines a rest position of the piston. It is displaced in the reverse direction by a control rod 11 which is coupled to the control means 4, which in this example consists of a clutch pedal.

The variations in volume which are thereby generated are transmitted to the receiver 2, the structure of which is similar to that of the emitter 1, with a piston the displacements of which are linked to the displacements of the control piston 8, so that there is no loss of load in the circuit.

The piston of the receiver 2 in this example actuates the clutch release bearing 111 which is associated with the clutch 5.

With reference to FIGS. 1 to 5, it can be seen that the whole of the emitter 1 is included in a casing 14 which comprises both the cylindrical chamber 9, which represents the maximum volume of the pressure chamber 44 which is limited by the piston 8, and a reserve space 45 of the piston 8, located in a rearward extension of the cylindrical chamber 9. The piston 8 is therefore located in this reserve space 45 in the rest position. The casing 14 is not completely full of fluid: on the contrary, it includes a zone 51 containing air at ambient pressure, above the normal fluid level 15; a reserve fluid volume is defined between the upper level of the cylindrical chamber 9 and the normal fluid level 15 within the casing 14.

Figure 2:
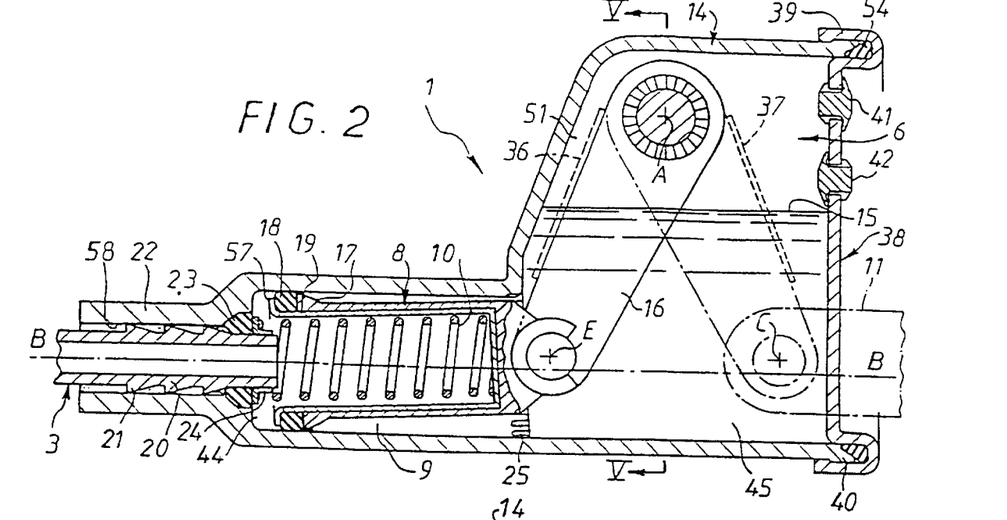
FIG. 2 is a view of the emitter, in longitudinal cross section taken on the line II—II in FIG. 5.

The piston 8 is pivoted on one end of the lever 16 in the interior of the casing 14, the other end of this lever 16 being rotatable about an axis A which is disposed above the normal level 15 of fluid in the casing 14.

Figure 3:
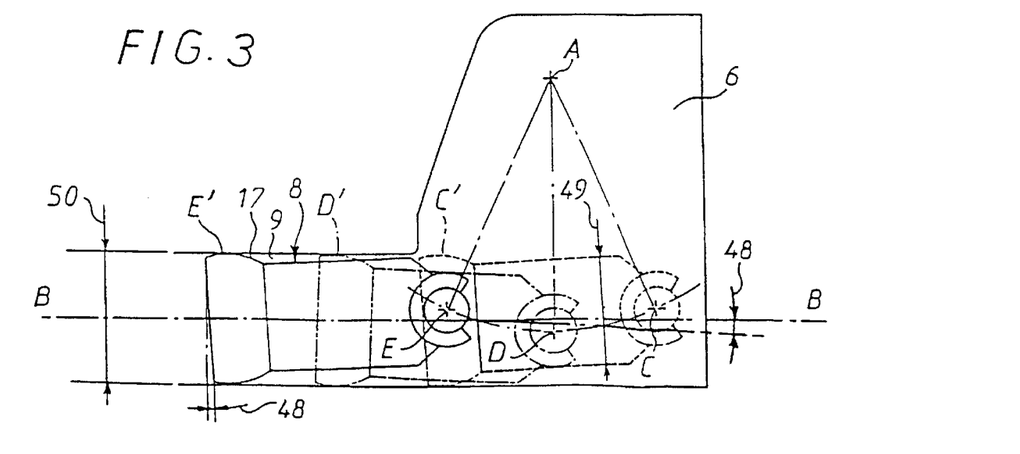
FIG. 3 is a diagram showing the path of travel of the piston within the casing.

As will be understood with reference to FIG. 3, this pivot about the axis A defines, for the end of the internal lever 16 pivoted on the piston 8, a rotational movement having an amplitude of about 60°, which is converted at the piston 8 into longitudinal motion within the cylindrical chamber 9, combined with a lateral displacement on either side of the longitudinal axis B of the cylindrical chamber 9. In the rest position, which is the extreme right hand position in FIG. 3, the pivot of the piston 8 is disposed slightly above the axis B, at the point C in FIG. 3; at mid-travel, the said pivot is slightly below this axis, at the point D, while in the fully retracted position, the said pivot is once again above the longitudinal axis B, at the point E. The corresponding positions of the front part of the piston 8 are marked by the points C', D', E' in FIG. 3.

The piston 8 is therefore not permanently in a position coaxial with the longitudinal axis B, but, on the contrary, it is displaced from it by a maximum angle 48 of a few degrees. The path of travel of the head 17 of the piston 8 is guided by the inner wall of the cylindrical chamber 8. For this purpose, the head 17 of the piston 8 is rounded, in the form of a spherical crown the amplitude of which has a value which is at least twice the maximum angle 48, so as to permit the piston 8 to advance without any friction in the cylindrical chamber 9. Similarly, the outer diameter 49 of the body of the piston 8 in its central part is smaller than the internal diameter 50 of the cylindrical chamber 9, so as to take into account lateral displacements of the piston 8, in particular in the end of travel and mid-travel positions, that is to say positions E-E' and D-D' respectively.

Figure 4:
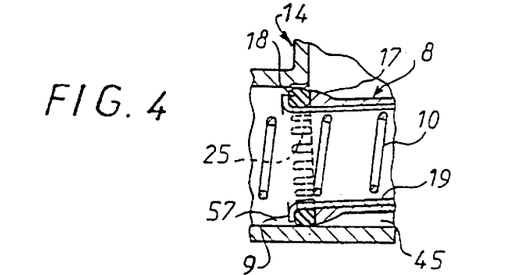
FIG. 4 is a scrap view in cross section, showing the feed grooves of the hydraulic fluid circuit.

The arrangement which ensures sealing of the pressure chamber 44 in line with the piston 8 can be seen in FIGS. 2 and 4, with the piston 8 being in its most advanced position E, FIG. 2, and in its rest position C, FIG. 4, respectively. This sealing is provided by a seal 18, which is an O-ring seal in this example but which in another version may have a rectangular cross section, and which is disposed in front of the piston 8 and maintained in position by retaining lugs 57 of a metal jacket 19 which follows the internal profile of the piston 8, which is hollow in the present case. Thus, a seal of conventional type is used, and in accordance with the invention its two faces are immersed in the hydraulic fluid, which improves the useful life of the seal.

On the side where the fluid pipe 3 is situated, the latter has a terminal connection 20 of rigid material, which has peripheral anti-recoil beads 21 adapted to be force-fitted into the cylindrical bore 58 formed in the nose 22 of the casing 14. Sealing is completed on this side by a further toroidal seal 23 which is held in place by a clamping washer 24. The helical return spring 10, which is adapted to urge the piston 8 towards its rest position C, bears, on the casing side, on this washer 24, while on the piston side it bears on the base of the jacket 19: thus the return spring 10 provides, in parallel, the functions of holding in position and putting under pressure the two seals 18 and 23.

In order to enable the hydraulic fluid circuit to be filled from the mass of reserve fluid in the reservoir, grooves 25, which are best seen in FIG. 4, are formed in the internal wall of the cylindrical chamber 9 in its neck through which it is open into the reserve space 45; the construction is such that, when the piston 8 is in its rest position C, its seal is level with these grooves 25. The grooves 25 are disposed at regular intervals all round the neck of the cylindrical chamber 9. About twenty grooves can thus be formed by conventional methods such as molding in the material of the casing 14, which is preferably made of plastics material, which has a large total passage cross section for fluid from the reservoir to pass to the cylindrical chamber 9.

As can be seen generally in FIG. 4, the grooves 25 are offset laterally, that is to say they are disposed at an angle with respect to the longitudinal axis B, so as to take account of the angle 48 of lateral offset of the piston 8 in the said rest position C. The lowermost grooves 25 are therefore the ones which are most offset towards the interior of the reservoir. Therefore, once the piston 8 is actuated, the advance of the seal 18 of the piston 8 beyond the grooves 25 provides sealing simultaneously over the whole of its circumference, and the hydraulic circuit is then pressurised, which improves response time in use.

Figure 6:
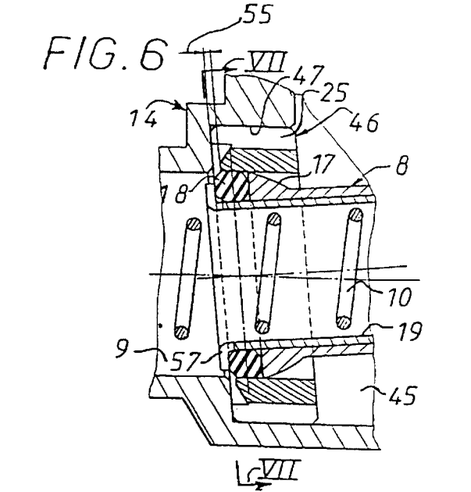
FIG. 6 is a view similar to FIG. 4 and shows a modified embodiment.
Figure 7:
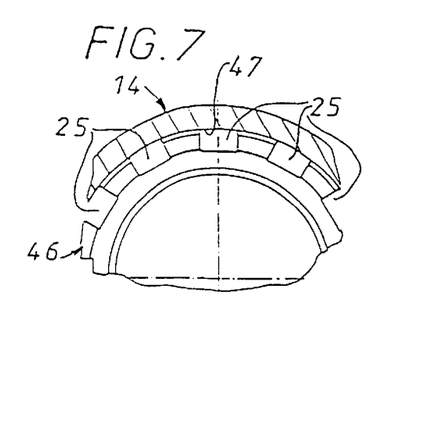
FIG. 7 is a partial view in cross section taken on the line VII—VII in FIG. 6, without the piston.

In the version shown in FIGS. 6 and 7, the grooves 25 are formed on the outer periphery of a sleeve member 46 which is force-fitted inside the casing 14 at the inlet end of the cylindrical chamber 9; they communicate with the said chamber 9 through an axial clearance 55 which is defined between the solid portion of the sleeve member 46 and the base of the seating 47; this clearance is free, as can be seen in FIG. 6, when the piston 8 is at rest; the seal 18 of the piston 8 is in cooperation in this position with the continuous internal cylindrical wall of the sleeve member 46.

Transmission of control signals for movement of the piston 8 is obtained by fixing together, at the level of the axis of rotation A of the internal lever 16, two levers 26, 27 outside the casing 14 with the said internal lever 16. It will be understood that action on the external levers 26, 27 is then naturally converted into rotational movement of the internal lever 16, and therefore displacement of the piston 8.

Figure 5:
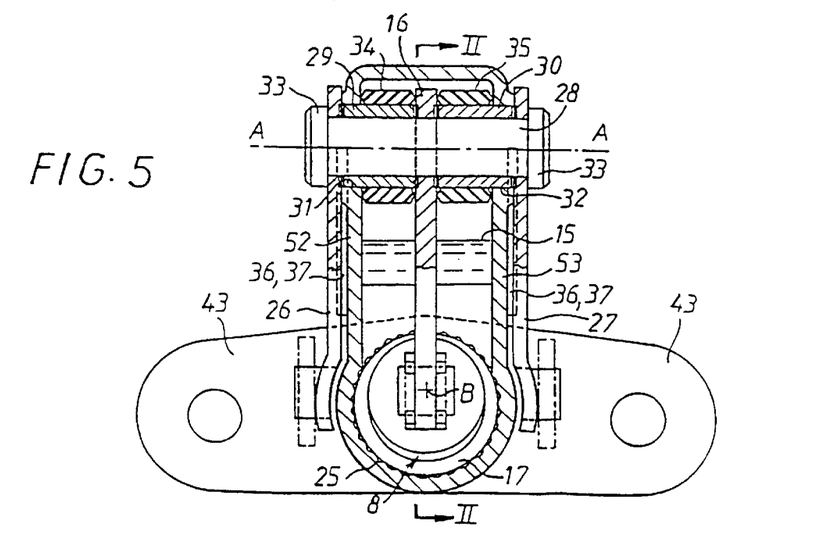
FIG. 5 is a view in cross section taken on the line V—V in FIG. 2.

The detail of the mechanical construction whereby these components are fixed together can be seen in FIG. 5. It is obtained for example by using ratchet rings 29, 30 which are disposed on a shaft 28 on either side of the internal lever 1 6. These rings 29, 30 are made of a harder material than that of the levers to be fixed together. The casing 14 has in its side walls 52, 53 two circular through holes 31, 25 32 respectively, the size of which is adapted to enable the ratchet rings 29, 30 to pass through them. The external levers 26, 27 are threaded over the shaft 28 and are held in place by seaming at 33 the ends of the shaft 28, or by some equivalent means, in an angular position which is identical to that of the internal lever 16. After the seaming operation, the seam can of course be replaced by welding.

The presence of ratchets on the sleeves 29, 30, during seaming of the levers, does of course cause the ratchets to bite into the softer material of the levers, which ensures angular positioning of the levers and ensures that they are secured against rotation.

The importance of this fastening lies in the fact that it is simple and that it is achieved at a location which lies above the normal level of the hydraulic fluid 15, and this greatly facilitates the achievement of sealing through the casing 14. Two annular seals 34, 35 are simply mounted at the outer surface of the ratchet wheels 29, 30, between the internal lever 16 and the side walls 52, 53 of the casing 14. These annular seals 34, 35 have little work to do, because they are disposed outside the hydraulic fluid, at atmospheric pressure, and because the angular displacement of the levers is limited to about 60°.

The external levers 26, 27 have geometry which is identical to that of the internal lever 16; the control rod 11 has a U-shaped end, each wing portion of which is pivoted on one of the two external levers 26, 27: this enables lateral imbalance of the forces to be avoided. The motion of the external levers 26, 27 is identical by construction, as has been seen above, to that of the internal lever 16. Front ribs 36 and rear ribs 37 are formed on the external side walls 52, 53 of the casing 14 so as to constitute end of travel stops for the external levers 26, 27, and so as thus to limit the displacement of the internal lever 16 in the casing 14 and therefore that of the piston 8, and so as to avoid any possible internal damage to the piston 8 or to the casing 14 when excessive movements of the control pedal 4 take place.

The casing 14 consists in practice of two elements: firstly the body of the casing which constitutes the major part of the latter and which includes the nose, the cylindrical chamber and the reservoir, and secondly a rear cover plate 38 which closes off the casing. The casing is preferably made of a relatively hard plastics material, and the internal grooves 25 and external ribs 36, 37 are formed by molding.

The cover plate 38 is made of a less hard plastics material; it is forcefitted over the body of the casing, by a flange 39 with which it is formed and which engages with a peripheral lip 40 which is formed at the periphery of the body of the casing, with a long seal 54 of circular cross section being inserted within the assembly and seamed in position during the assembly operation.

The cover plate 38 has two through holes or orifices which are situated above the normal fluid level 15, and in which two valves 41, 42 are mounted for equalising the air pressures between the interior and the exterior of the casing, with one of these valves, 42, serving to admit air into the reservoir, while the other valve 41 allows air to escape from the reservoir. The valve 42 also enables the reservoir to be filled with hydraulic fluid. The valves 41, 42 are conventional, and are identical to each other and mounted in opposition to each other so as to perform the two functions of air admission and release. They do however ensure sealing for the hydraulic fluid under normal atmospheric pressure.

At the other end of the pipe 3, the hydraulic receiver 2 may be of any type whatever. In the preferred embodiment, it is however a hydraulic control unit, in particular for a clutch, designed in accordance with a principle similar to that of the emitter 1.

Figure 8:
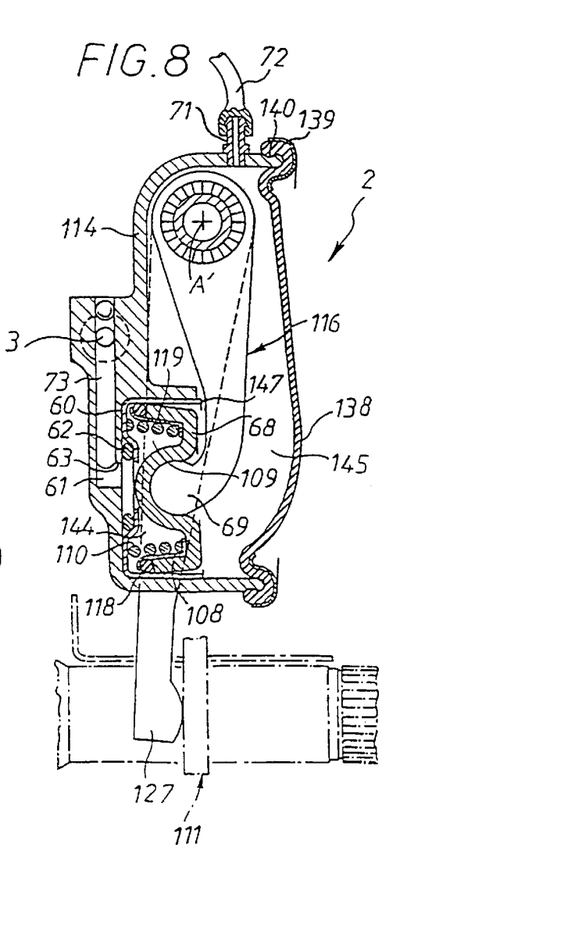
FIG. 8 is a view of the receiver, in cross section taken on the line VIII—VIII in FIG. 9.
Figure 9:
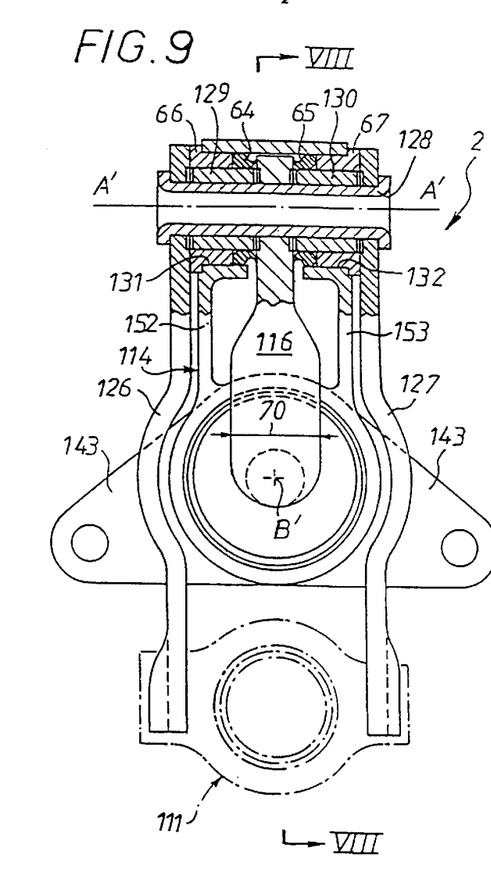
FIG. 9 is a view of the receiver, seen from the front and partly in cross section.

This design will appear more clearly on an examination of FIGS. 8 and 9. These show that the receiver 2 is of a very compact form and is very suitable for application to a clutch control system.

The receiver 2 has a casing 114, which includes both a cylindrical chamber 109 and a front space 145, for a piston 108 which is located in the extension of the cylindrical chamber 109.

In general terms, the cross section of the cylindrical chamber 109, in which the piston 108 of the receiver 2 is displaced, is generally larger than that of the emitter 1, so that the force applied on the piston 108 of the receiver 2 is therefore increased as compared with the control force applied on the piston 8 of the emitter 1, in a ratio which is equal to the ratio of the surface areas of the pistons 8 and 108.

The piston 108 is pivoted on one end of an internal lever 116 in the casing 114, with the other end of the internal lever 116 being rotatable about an axis A' which lies above the longitudinal axis B' of the cylindrical chamber 109, the axes A' and B' being orthogonal to each other.

With a view to reducing the length of the receiver 2, the piston 108 has a hollow hemispherical profile in its front face 68, in which the end or head 69 of the internal lever 116, of complementary form, is inserted. The horizontal axis of rotation A' of the internal lever 116 is disposed substantially above the neck 147 of the cylindrical chamber 109, which also contributes to a reduction in the length of the receiver 2. As a result of this, the internal lever 116 has a curved profile which enables it to pass around the neck 147 of the cylindrical chamber 109. With a view to increasing its mechanical resistance to the forces transmitted by the piston 108, the internal lever 116 has a downward cross section, along its longitudinal axis, which is such that the reduction in local width linked to the curved form of the profile is compensated for by an increased thickness 70 at this point.

As in the case of the emitter 1, pivoting of the piston 108 on the internal lever 116 defines, for the head 69 of the internal lever 116, a rotary movement with an amplitude of about 10°, which is converted at the level of the profile of the front face 68 of the piston 116 into longitudinal motion in the cylindrical chamber 109 combined with lateral displacement about the longitudinal axis B' of the cylindrical chamber 109.

The head of the piston 108 in this example is further guided in the cylindrical chamber 109. The periphery of the piston 108 is substantially frusto-conical, with a cone angle which takes account of the maximum angle of inclination of the piston coupled with its movement about the head of the internal lever 116 during its longitudinal displacement.

The means for sealing the pressure chamber 144 can be seen in FIG. 6, in which the piston 108 is shown in the position in which it is at the end of its travel into the cylindrical chamber 109. This sealing is obtained, firstly, by means of a seal 118 which in this example is a toroidal seal, disposed in front of the piston 108 and held in place by seaming lugs of an applicator 119 which follows the internal profile of the piston 108, which in the present case is also hollow, and secondly by a seal 62, which is toroidal here but which in another version is of rectangular cross section, and which is inserted between the base of the cylindrical chamber 109 and a metal jacket 60 which matches the profile of the cylindrical chamber 109, for which it constitutes an internal liner; more precisely, the said metal jacket 60 is drilled out in line with the exit end 63 of a hydraulic duct 61 which surrounds the toroidal seal 62.

A helical spring 110 or preloading spring bears on the same side as the casing on the jacket 60, while on the side of the piston 108 it bears on the applicator 119; in this way it fulfills a function of holding in place and gripping the seals 118 and 62.

Transmission of the controls for movement of the piston 108 is obtained by coupling together, at the level of the axis of rotation A' of the internal lever 116, two levers 126, 127 outside the casing 114 with the internal lever 116. It will therefore be understood that displacement of the piston 108 in response to a control signal transmitted in the hydraulic duct 61, which is connected to a feed duct 73 which is itself connected to the pipe 3, causes the internal lever 116 to perform a rotary movement about the axis A', and therefore causes the external levers 126, 127 to rotate.

The external levers 126, 127 are symmetrical with each other, their length is greater than that of the internal lever 116. They constitute a fork for transmitting forces to the clutch release bearing 111. The angular movement of the external levers 126, 127 is identical by construction to that of the internal lever 116.

Details of the mechanical structure of the three levers 116, 126 and 127 can be seen in FIG. 7. It is obtained in a manner which is generally identical to the construction of the three levers 16, 26 and 27 of the emitter 1. In this case again, ratchet sleeves 129, 130 are used, which are disposed on a shaft 128 on either side of the central internal lever 116. The casing 114 has, in its lateral walls 152, 153, two circular bores 131, 132, the sizes of which are adapted to enable the shaft 128, surrounded by the ratchet sleeves 129, 130, which are themselves surrounded by seating rings 66, 67, to pass through. The external levers 126, 127 are mounted on the shaft 128 and are held fast in position against the ratchet rings 129, 130 and the internal lever 116, by seaming.

Two lip seals 64, 65 are mounted at the outer surface of the ratchet sleeves 129, 130, between the internal lever 116 and the seating rings 66, 67. The lip seals 64, 65 have little work to do, to the extent that the angular displacement of the shaft 128 is limited to approximately 10°, more or less.

The casing 114 is preferably made of aluminum which is injection cast in accordance with a known technique. It has two external fastening lugs 143 of conventional type. A rear cover plate 138 closes off the casing 114. This cover plate 138 is made of a flexible material such as an elastomer, in the form of a membrane which is adapted to deform elastically in order to absorb the variation in volume due to the advance of the piston when the circuit is under pressure. It is fitted over the body of the casing 114, with a collar 139, which is for example of metal, putting the flange of the cover plate 138 into engagement with a peripheral lip 140 formed on the body of the casing 114.

The downstream space 145 is normally filled with hydraulic fluid; in order to prevent the membrane 138 from being subjected to a persistent internal pressure, the casing 114 has in its upper part a nozzle 71 connected to a tube 72 for returning fluid to the reservoir of the emitter, above the normal level 15 of the latter, and preferably in the lower part of the reserve space 45, which enables the receiver 2 to be kept full of fluid; thus, the membrane 138 is temporarily deformed for the time that it takes the fluid to pass through the connector 71.

Operation of the emitter 1 and receiver 2 in accordance with the invention is conventional, and in general terms it is in conformity with the operation of a traditional hydraulic control circuit. This has been partly described above.

The emitter 1 in accordance with the invention is installed in a way similar to that for a conventional master cylinder, and may be in replacement for the latter on an existing vehicle, the fastening flanges 43 which it includes being so designed as to be compatible with the dimensions which are conventional in this context.

The control rod 11 is attached to the external levers 26, 27, and the pipe 3 is connected to the casing 14.

The receiver 2 according to the invention is also installed in the traditional way.

After the reservoir of the emitter 1 has been filled, which may be done through the admission valve 42, and after air has been bled from the circuit, using a technique known to the person in the art, the emitter 1 according to the invention operates in the conventional way.

In the rest position, which in the present example is that in which the clutch is engaged, the piston 8 is in its rearward position C under the action of the spring 10. The grooves 25 then enable fluid to pass through. When the user applies the clutch pedal 4, pressure is applied to the piston 8, which advances into the chamber 9, thus causing, after passage of the fluid through the grooves 25 or axial clearance 55, a variation in volume in the receiver 2, which causes the clutch to be disengaged.

As will have been understood from a reading of the foregoing description, the main advantages are as follows:
 the use of pressure seals of simple and inexpensive technology,
 very simple fitting of the seal on the pistons,
 absence of any sophisticated machining;
 absence of any disadvantages of conventional leaks, and general simplification in the air sealing of the hydraulic circuit,
 an effective mechanism for preventing return of fluid during the pressurisation of the circuit, based here on the uncovering or covering of grooves or the clearance by the piston, instead of the traditional valve-type arrangement. A traditional valve device does not go well with gentle pressure on the clutch pedal, which will not fully close the valve, so that the fluid continues to rise in the reservoir while the pedal is "pushed". In the present case, once the piston has passed beyond the grooves, sealing is independent of the pressure exerted on the clutch pedal.

The grooves are formed in such a way that the passage of fluid from the grooves to the through hole does not cause any damage to the seal.

Numerous other versions may be considered according to the circumstances of use, both as regards the way the internal and external levers are coupled together (welding of the levers on the sleeves may provide an effective solution), and as regards the detail design of the piston or the hydraulic fluid feed grooves.

The scope of the present invention is not limited to the details of the embodiments described above by way of example, but extends, on the contrary, to modifications within the capability of the person in this technical field. For example, the choice of a means for transmitting the movement of the control member to the piston, other than a mounting by three levers the axis of which is situated outside the level of the fluid, as described without limitation and by way of example above, enables a pressure seal to be achieved for the chamber which is totally immersed in the fluid.

What is claimed is:

1. An emitter (1) for a hydraulic control system, adapted to be controlled by a control member (4) and comprising a hydraulic chamber (9), in which the piston (8) is mounted for sliding movement sealed by a seal (18) and defining therein a variable volume pressure chamber (44) connected to a hydraulic pipe (3), a reserve space (45) is adapted to contain hydraulic fluid up to a level (15) which is sufficient for the seal (18) to be immersed therein and to constitute the volumetric compensation reservoir (6) of the hydraulic circuit, a transmitting means (16, 26, 27) for transmitting movement of the control member (4) to the piston (8), wherein the hydraulic chamber (9) and the reserve space (45) are formed in a common casing (14), the reserve space (45) being coupled to the pressure chamber (44) through at least one passage (25), a means for preventing return of fluid to the reservoir (6) during pressurization of the pipe (3) and wherein the transmission means (16, 26, 27) includes at least two parts, a first one said two parts (16) is internal to the casing (14) and connected to the piston (8), while a second one of said two parts (26, 27) is external to the casing (14), the two parts (16, 26–27) being coupled together through a member passing through a wall (52, 53) of the casing, wherein the reserve space (45) of the piston (8) is located in the rearward extension of the cylindrical chamber (9) to receive the piston (8) in a rest position in such a way that the hydraulic chamber (9) is extended in a longitudinal axis (B) by the reserve space, and the piston (8) is pivoted on one end of the interior part (16) of the casing (14) of the transmitting means and the seal (18) is disposed in front of the piston (8).

2. An emitter according to claim 1, wherein the part (16) internal to the casing (14) extends through the free surface of the liquid, and a member extending through the casing (14) extends above the level of the liquid.

3. An emitter according to claim 1, wherein the piston (8) has an outer diameter (49) of body, in its central part, smaller than internal diameter (50) of the hydraulic chamber (9) and the head of the piston (8) is guided by the inner wall of the hydraulic chamber (9) during travel, and in the rest position of the piston (8), the seal (18) is level with grooves (25).

4. An emitter according to claim 1, wherein the transmission means consists of three levers (16, 26, 27) fixed to a shaft (28), which is free to rotate about a horizontal axis (A) and which extends through side walls (52, 53) of the casing (14), with one of the three levers, namely an internal lever (16), being included in the reservoir (6), while the other two of the three levers, being external levers (26, 27), are outside the casing (14).

5. An emitter according to claim 4, wherein the hydraulic chamber (9) and the reserve space (45) are incorporated in the casing (14), which is substantially symmetrical on a vertical plane containing the longitudinal axis (B) of the pressure chamber (44), the side walls (52, 53) of the casing (14) being mainly vertical, and the three levers (16, 26, 27) having substantially identical geometry.

6. An emitter according to claim 4, wherein the three levers (16, 26, 27) are of identical lengths.

7. An emitter according to claim 6, wherein a means fastening the levers (16, 26, 27) on the shaft (28) consists of rings fitted on the shaft (28) between the said levers.

8. An emitter according to claim 7, wherein the rings (29, 30) are ratchet rings of a material harder than that of the levers (16, 26, 27), and on which the levers (16, 26, 27) are an interference fit.

9. An emitter according to claim 7, wherein sealing of the casing (14) in the region of the shaft (28) is provided by means of annular seals (34, 35) which are fitted on the outside of the rings (29, 30), between the internal lever (16) and the side walls (52, 53) of the casing (14).

10. An emitter according to claim 7, wherein the three levers (16, 26, 27) are fixed to the shaft (28) in the same angular position.

11. An emitter according to claim 10, wherein the casing (14) has on, the outer faces of its side walls (52, 53), ribs (36, 37) which define abutments for limiting the maximum amplitude of the movements of the levers (26, 27).

12. An emitter according to claim 4, wherein a head of the piston (8) is guided by an inner wall of the hydraulic chamber (9) during its travel.

13. An emitter according to claim 4, wherein the piston (8) has a head in the form of a spherical ring (17), for taking account of a maximum tilt angle (48) of the piston (8) due to the path of travel of its rear part through which it is connected to the internal lever (16).

14. An emitter according to claim 1, wherein the passages (25) connecting the reservoir (6) to the pressure chamber (44) are grooves (25) formed within the inner wall of the cylindrical chamber (9) at the level of its exit into the reserve space (45), the said grooves (25) having a direction which is substantially parallel to the longitudinal axis (B) of the cylindrical chamber (9).

15. An emitter according to claim 1, wherein the passages (25) connecting the reservoir (6) to the pressure chamber (44) are grooves (25) formed at the outer periphery of a sleeve member (46) which is force-fitted in a seating (47) formed in the interior of the casing (14), at the inlet end of the cylindrical chamber (9) with which they communicate through an axial clearance (55).

16. An emitter according to claim 14, wherein the grooves (25) are spaced apart circumferentially at regular intervals.

17. An emitter according to claim 4 wherein at least the ends of the grooves (25) are disposed at an angle, with respect to the longitudinal axis (B) of the cylindrical chamber (9), which is the same as the corresponding angle in the rest position (C) of the piston (8).

18. An emitter according to claim 1, wherein the means for preventing return of fluid to the reservoir during pressurisation of the circuit consists of the seal (18).

19. An emitter according to claim 18, wherein the seal (18), which is for example toroidal or of rectangular cross section, is a toroidal seal located in line with the ends of the grooves (25) when the piston (8) is in its rest position (C).

20. An emitter according to claim 1, wherein the casing (14) includes an air admission valve (42) disposed above a normal fluid level (15).

21. An emitter according to claim 20, wherein the casing (14) includes an air relief valve (41) disposed above in the normal fluid level (15).

22. An emitter according to claim 21, wherein the casing (14) includes a cover plate (38).

23. An emitter according to claim 22, wherein the cover plate (38) constitutes the rear wall of the reserve space (45) and reservoir (6), the said wall being substantially vertical and at right angles to the longitudinal axis (B) of the cylindrical chamber (9).

24. An emitter according to claim 22, wherein he cover plate (38) includes a flange (39) which is adapted to fit tightly on a peripheral lip (40) formed on the body of the casing (14).

25. An emitter according to claim 24, wherein it includes a seal (54) which is adapted to come into engagement between the cover plate (38) and the body of the casing (14).

26. An emitter according to claim 22, wherein at least one of the valves (41, 42) is carried by the cover plate (38).

27. A hydraulic control system comprising an emitter (1) and a receiver (2) which are connected together through the hydraulic pipe (3) wherein the emitter (1) is in accordance with claim 1.

28. A hydraulic control system according to claim 27, wherein the receiver (2) comprises a cylindrical chamber (109), a piston (108) mounted for sliding movement in the cylindrical chamber (109) so as to define therein a variable volume pressure chamber (144) connected to the hydraulic pipe (3), the transmitting means (116, 126, 127) for transmitting movements of the piston (108) to the outside, and a means for sealing the pressure chamber (144), the receiver being characterised in that the pressure chamber (144) is extended along its longitudinal axis (B') by a downstream space (145) which is adapted to receive the piston (108) in its pressure position when the circuit is pressurized, the cylindrical chamber (109) and the downstream space (145) being incorporated within a single casing (114), and the transmission means (116, 126, 127) consists of at least two parts, one of which (116) is internal to the casing (114) while the other one (126, 127) is outside the casing (114), the two parts being connected together through a member extending sealingly through the wall (152, 153) of the casing (114).

29. A hydraulic control system according to claim 28, wherein the transmission means (116, 126, 127) comprises three levers (116, 126, 127) fixed to a shaft (128) which is freely rotatable about a horizontal axis (A') extending through the side walls (152, 153) of the casing (114), with one of the levers, namely an internal lever (116), being situated in the casing (114), while the other two levers, being external levers (126, 127) external to the casing, are symmetrical to each other and longer than the internal lever (116).

30. A hydraulic control system according to claim 29, wherein the levers (116, 126, 127) are coupled to the shaft (128) by means of ratchet rings (129, 130) of a material higher than that of the levers (116, 126, 127), and secured on the shaft (128) between the said levers, and the levers (116, 126, 127) are fitted on the ratchet rings with an interference fit.

31. A hydraulic control system according to claim 30, wherein sealing of the casing (114) in line with the shaft (128) supporting the three levers (116, 126, 127) is obtained by means of lip seals (64, 65) which are secured on the outside of the rings (129, 130) and which are disposed axially between the internal lever (116) and the side walls (152, 153) of the casing (114).

32. A hydraulic control system according to claim 31, wherein seating rings (66, 67) are secured between the rings (129, 130) and the casing (114).

33. A hydraulic control system according to claim 28, wherein the head of the piston (108) of the receiver (2) is guided in the cylindrical chamber (109).

34. A hydraulic control system according to claim 28, wherein a hydraulic feed duct (61) exhausts into the cylindrical chamber (109), the said chamber including a metallic jacket (60), open to the mouth of the hydraulic duct (61) and matching the internal form of the cylindrical chamber (109) which it lines.

35. A hydraulic control system according to claim 31, wherein the head (117) of the piston (108) carries a seal (118) such as a torodial seal, which is disposed in front of the piston (108) and held in place by gripping lugs of an applicator (119) which matches the internal form of the piston (108), which is accordingly hollow.

36. A hydraulic control system according to claim 35, a wherein helical spring (110) is disposed between the casing (114) and the piston (108), the said helical spring (110) bearing on the metallic jacket (60) on the same side as the casing (114), and on the applicator (119) on the same side as the piston (108).

37. A hydraulic control system according to claim 34, wherein a seal (62), which is for example toroidal or of rectangular cross section, is inserted between the base of the cylindrical chamber (109) and the metallic jacket (60), the said seal (62) surrounding the mouth (63) of the hydraulic duct (61) in the cylindrical chamber (109).

38. A hydraulic control system according to claim 33, wherein the piston (108) of the receiver (2) includes, in its front face (68), a hollow hemispherical form adapted to receive the head (69) of the internal lever (116), the form of which is complementary.

39. A hydraulic control system according to claim 33, wherein the piston (108) of the receiver (2) has a substantially frustoconical peripheral surface.

40. A hydraulic control system according to claim 39, wherein the casing (114) of the receiver (2) has a removable cover (138).

41. A hydraulic control system according to claim 40, wherein the cover plate (138) of the casing (114) of the receiver (2) constitutes the front wall of the downstream space (145), substantially vertical and at right angles to the longitudinal axis (B') of the cylindrical chamber (109).

42. A hydraulic control system according to claim 41, wherein the removable cover (138) of the receiver (2) is of a flexible material constituting a membrane.

43. A hydraulic control system according to claim 28, wherein the casing (114) of the receiver (2) includes a return element (71) adapted to return the hydraulic fluid from the downstream space (145) to the reservoir of the emitter (1).

44. A hydraulic control system according to claim 36, wherein the control member is a hydraulic control unit for a clutch.

45. A hydraulic control system according to claim 44, in which the clutch includes resilient gripping means and declutching means consisting of declutching levers, a clutch release bearing (111) adapted to act on the ends of the declutching levers for disengaging the clutch being provided, characterised in that the helical spring (110) subjects the internal lever (116) to a force which is such that, through the external levers (126, 127), the clutch release bearing (111) is in contact with the declutching levers, the resilient gripping means of the clutch exerting a force very much greater than that exerted by the helical spring (110).

* * * * *